United States Patent [19]

Verhoeven et al.

[11] 3,876,830

[45] Apr. 8, 1975

[54] DEMODULATOR CIRCUIT FOR DEMODULATING AN AMPLITUDE-MODULATED PULSE SIGNAL

[75] Inventors: Leonardus Adrianus Johannes Verhoeven; Hendrikus Dollekamp; Henricus Johannes Josephus Catharina Meyer, all, of Emmasingel, Eindhoven, Netherlands

[73] Assignee: U. S. Philips Corporation, New York, N.Y.

[22] Filed: July 24, 1974

[21] Appl. No.: 491,558

Related U.S. Application Data

[63] Continuation of Ser. No. 344,262, March 23, 1973, abandoned.

[30] Foreign Application Priority Data

Apr. 18, 1972 Netherlands ........................ 7205161

[52] U.S. Cl. ............ 178/7.3 R; 178/5.8 R; 329/109

[51] Int. Cl. ............................................ H04n 5/44

[58] Field of Search ......... 178/5.4 SD, 5.6, DIG. 26, 178/5.8 R, 7.3 R; 179/15 AA; 325/321, 326; 329/105, 109

[56] References Cited

UNITED STATES PATENTS

| | | | |
|---|---|---|---|
| 2,563,684 | 8/1951 | Lord | 178/5.8 R |
| 2,589,100 | 3/1952 | Lawson et al. | 178/5.6 |
| 2,671,130 | 3/1954 | Weighton et al. | 178/5.6 |
| 3,110,867 | 11/1963 | Flowers | 329/109 |
| 3,182,133 | 5/1965 | Schlichte | 179/15 AA |
| 3,466,387 | 9/1969 | Rout | 178/5.6 |

FOREIGN PATENTS OR APPLICATIONS

| | | | |
|---|---|---|---|
| 890,969 | 9/1953 | Germany | 325/5.8 R |

*Primary Examiner*—Robert L. Griffin
*Assistant Examiner*—Jin F. NG
*Attorney, Agent, or Firm*—Frank R. Trifari; Henry I. Steckler

[57] ABSTRACT

An interference-free sampling circuit operating without a clamping circuit for demodulating a pulse amplitude-modulated sound signal which occurs during the line blanking periods of a television signal comprises a resonant circuit which is switched on before a sampling instant for such a period that the switch-on phenomenon exhibits a zero crossing at the sampling instant.

6 Claims, 3 Drawing Figures

DEMODULATOR CIRCUIT FOR DEMODULATING AN AMPLITUDE-MODULATED PULSE SIGNAL

This is a continuation, of application Ser. No. 344,262, filed Mar. 23, 1973, abandoned.

The invention relates to a demodulator circuit for demodulating an amplitude-modulated pulse signal which occurs during the line flyback periods of a television signal. The demodulator circuit comprises a gating circuit coupled to a video signal input and having a gating signal input coupled to an output of a gating signal generator. A storage circuit is coupled to an output of the gating circuit.

A demodulator circuit of this kind is known from German Pat. Specification No. 890.969 in which the video signal source is a detector which applies the video signal to the said gating circuit while maintaining its d.c. component.

An object of the invention is to provide a demodulator circuit which is suitable for television systems in which the d.c. component of the video signal is lost and in which the occurrence of interference signals due to clamping circuits is prevented.

To this end a demodulator circuit of the kind described in the preamble according to the invention is characterized in that an input of the said gating circuit is coupled to a resonant circuit which is coupled through a further gating circuit to the video signal input. The gating signal input of said further gating circuit is coupled to an output of the gating signal generator at which a gating signal is produced which precedes a gating signal occurring at the first-mentioned gating signal output. The resonant period of the resonant circuit and the occurrence of the said gating signals is attuned in such a manner that an oscillation generated in the resonant circuit as a result of enabling the further gating circuit exhibits a zero crossing when the first gating circuit is enabled.

Due to this step the use of a clamping circuit becomes superfluous so that the interference signals caused thereby are obviated. While furthermore, noise interferences in the output signal of the circuit are greatly suppressed due to the integrating action of the circuit.

The invention will now be described with reference to the drawing.

In the drawing

Figure 1:
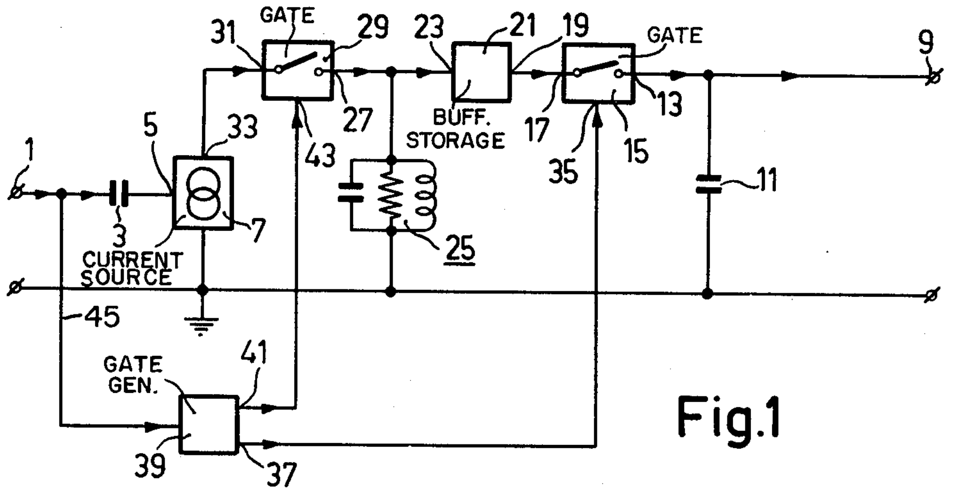
FIG. 1 shows by way of a mixed block-schematic diagram a demodulator circuit according to the invention.

In FIG. 1 a video signal input 1 of the demodulator circuit is connected through a capacitor 3 to an input 5 of a current source circuit 7. The capacitor 3 indicates that a video signal applied to the input 5 and denoted by 205 in FIG. 2 does not comprise any d.c. component.

The demodulator circuit has an output 9 to which a capacitor 11 connected at the other end to earth and serving as a storage circuit and an output 13 of a gating circuit 15 are connected. An input 17 of the gating circuit 15 is connected to an output 19 of a buffer stage 21 which has, for example, an amplification factor which is equal to one and an input 23 of which is connected to a resonant circuit 25 the other end of which is connected to earth and to an output 27 of a further gating circuit 29 an input 31 of which is connected to an output 33 of the current source circuit 7.

A gating signal input 35 of the gating circuit 15 is connected to an output 37 of a gating signal generator 39 a further output 41 of which is connected to a gating signal input 43 of the further gating circuit 29.

Figure 2:
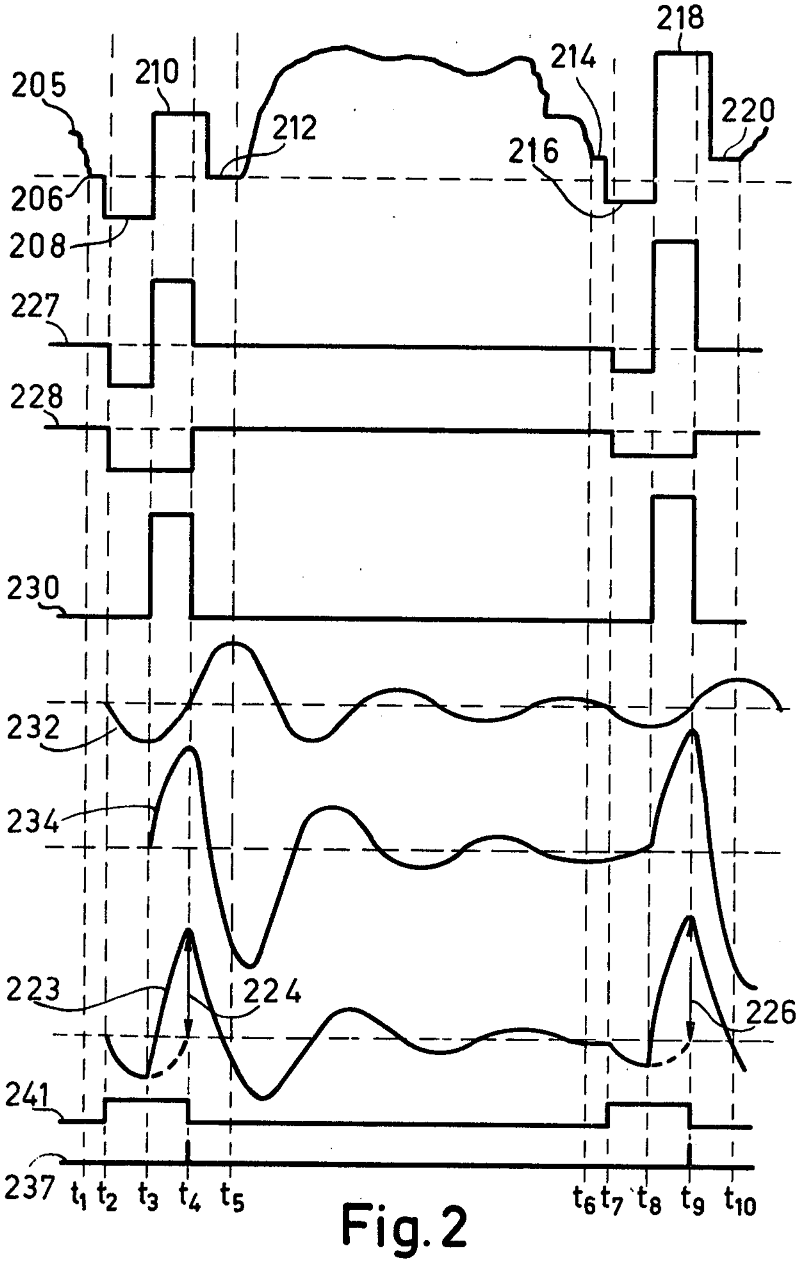
FIG. 2 shows a number of waveforms within the circuit according to FIG. 1

Furthermore the gating signal generator 39 has an input 45 which is connected to the video signal input of the circuit. The gating signal generator 39 is synchronized with the aid of synchronizing signals which are present in a video signal applied to this input 45 so that gating signals coupled with the video signal occur at the outputs 37 and 41. In FIG. 2 these gating signals are shown with the waveforms associated with reference numerals 237 and 241.

During the line flyback periods of the video signal 205 between the instants $t_1$ and $t_5$ and $t_6$ and $t_{10}$ in FIG. 2 line synchronizing pulses 208 and 216, pulses 210 and 218 amplitude-modulated, for example, by an audio signal and back porches 212 and 220 occur successively at front porches 206 and 214, respectively.

The front and back porches 206, 212 and 214, 220 of the video signal 205 show different levels in successive flyback periods relative to a zero level denoted by a broken line. This level difference may be, for example, a result of the absence of a clamping circuit but does not exert any influence on the operation of the circuit as will be apparent hereinafter.

Among the waveforms occurring in FIG. 2, 227 denotes the current which is applied by the current source circuit 7 to the resonant circuit 25 via the further gating circuit 29. This current has a value different from zero only during the periods $t_2$ to $t_4$ and $t_7$ to $t_9$ because the further gating circuit 29 is rendered conducting by the gating pulse 241 during these periods.

The waveforms 228 and 230 represent components in which the waveform 227 can be split up. Each of these components causes a voltage 232 and 234 across the resonant circuit 25 which compositely lead to a signal of the waveform 223 which signal illustrates the voltage occurring at the input 23 of the buffer stage 21.

The waveform 228 of the signal 227 represents the unwanted component which is caused by the instantaneous level from which the desired component 230 of the audio signal rises up every time.

As a result of the structure of the circuit this component 228 does not have any interfering influence. To explain this the voltage waveform 232 generated by this component 228 across the circuit 25 is shown separately. The resonant circuit is tuned in such a manner that the oscillation produced by the edge of the waveform 228 occurring at the instants $t_2$ and $t_7$ exhibits a zero crossing at the instants $t_4$ and $t_9$, respectively. The voltage component 234 produced as a result of the desired current component 230 then exhibits exactly a maximum value whose amplitude is proportional to the amplitude of the associated current pulses.

The composite signal 223 across the circuit 23 therefore has values 224 and 226 every time at the instants $t_4$ and $t_9$ which values only depend on the amplitude of the sound pulse and not on the location of the black level of the video signal. At these instants the gating circuit 15 is rendered conducting for a short period by means of the gating signal 237 so that the capacitor 11 takes over the signal values 224, 226 at the relevant instants and then retains them. The signal thereby produced at the output 9 yields the desired demodulated sound signal after suitable filtering.

It will be evident that for the desired effect mainly the behaviour of the circuit 25 between the instants $t_2$ and $t_4$ and $t_7$ and $t_9$ is important. It may proved to be favourable to damp this circuit outside the said periods. In the case where the line period is an integral number of times the duration of the said periods the oscillation caused by the interfering signal from the previous line period exhibits a zero crossing again exactly at the instant of occurrence of the gating signal 237 in the next line period and thus has no influence. In that case damping might be omitted.

The possible influence of the interfering component 228 during a subsequent line period is furthermore generally negligible when the circuit 25 has a quality factor which is most suitable for a favourable signal-to-noise ratio of the output signal and which lies between one and a half and three, preferably at two.

The interference component 228 which is generally produced by shifting the black level as a result of the picture content may alternatively be influenced by signals which do not belong in the video signal such as, for example, hum or cross-talk signals. Such signals neither have any harmful influence on the demodulated signal in this circuit.

The resonant circuit described hereinbefore was tuned in such a manner that the period $t_2$-$t_4$ corresponded to a half period of a ringing effect generated in the circuit. The tuning frequency of the circuit might alternatively be chosen to be such that an integral number of half periods of an oscillation would be located in the said period. The instants of occurrence of the leading edges of the pulses 230 must then be located relative to the gating pulses 237 in such a manner that at the instant of occurrence of these pulses approximately the maximum amplitude of the desired signal occurs across the circuit 25, that is to say, a quarter of a period plus possible an integral number of times a half period must be located between the said edge and the relevant gating pulse.

If desired, the modulated pulse in the video signal may be directed towards the other side, hence towards the side of the black level remote from the picture signal.

Extensions such as, for example, the use of taps on a circuit or of multiple circuits known from the switching technique may be included, if desired, in an adapted manner in a circuit according to the invention.

Instead of a current source circuit 7 it is alternatively possible to use a voltage source circuit. If necessary, the resonant circuit 25 may be formed in that case as a series circuit.

Figure 3:
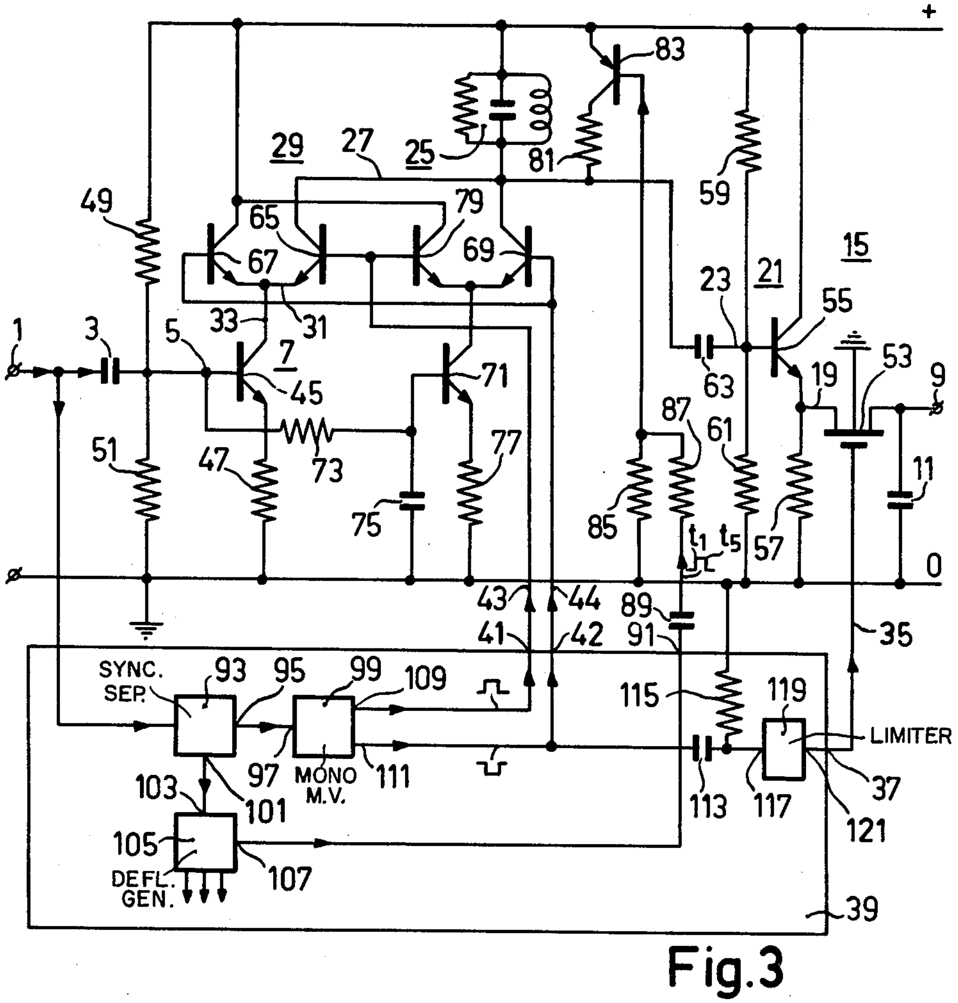
FIG. 3 shows a circuit diagram of an embodiment of a demodulator circuit according to the invention.

In FIG. 3 corresponding components have the same reference numerals as those in FIG. 1. The current source circuit 7 is constituted by an npn transistor 45 whose emitter is connected to earth through a resistor 47 and whose base is connected to the tap on a potential divider 49,51 between a positive voltage + and earth O.

The first gating circuit 15 includes a field effect transistor 53 the gate electrode of which is connected to the input 35 to which the gating pulse 237 is applied and whose source and drain electrodes are connected to the capacitor 11 and the output 19 of the buffer stage 21. This output 19 is connected to the emitter of an npn transistor 55 arranged as an emitter follower and constituting the buffer stage 21 and its collector is connected to the positive supply voltage + and its emitter is connected to earth through a resistor 57. The base is connected to the tap on a potential divider 59, 61 between + and O and through a capacitor 63 to the circuit 25 the other side of which is connected in this case to the positive voltage +.

Furthermore the circuit 25 is connected to the collector of an npn transistor 65 which constitutes the further gating circuit 29 and whose emitter is connected to the collector of the transistor 45. The transistor 65 conducts during the periods $t_2$-$t_4$, $t_7$-$t_9$ as a result of positive pulses 241 at its base originating from the output 41 of the gating signal generator 39. During the rest of the period the transistor 65 is cut off and the current supplied by the current source transistor 45 is taken over by an npn transistor 67 whose emitter is connected to that of the transistor 65, the collector being connected to the positive voltage + and the base being connected to an input 44 which is connected to an input 44 connected to an output 42 of the gating signal generator 39 and at which a pulse signal of opposite direction as compared with that of the output 41 is produced.

In order to prevent unwanted direct current steps through the circuit 25 an npn transistor 69 is rendered conducting when the gating transistor 65 is cut off and its collector is connected to the circuit 25, its emitter is connected to the collector of a direct current source transistor of the npn type and its base is connected to the input 44. The base of the transistor 71 is connected through a resistor 73 to the base of the video signal current source transistor 45 and is decoupled with respect to alternating current by a capacitor 75. The emitter of the transistor 71 is connected through a resistor 77 to the zero connection O. The direct current supplied by the transistor 71 through the transistor 69 to the circuit 25 when the transistor 65 is cut off is therefore equal to that which is supplied through the transistor 65 when the transistor 69 does not conduct.

During the period when the transistor 69 is cut off the current supplied by the direct current source transistor 71 is depleted by an npn transistor 79 whose emitter is connected to that of the transistor 69, whose base is connected to that of the transistor 65 and whose collector is connected to that of the transistor 67.

Furthermore a damping circuit is provided across the circuit 25 which damping circuit consists of a series arrangement of a resistor 81 and a pnp transistor 83 whose base is connected to earth through a resistor 85 and is furthermore connected through a resistor 87 and a capacitor 89 to an output 91 of the gating signal generator 39. During the periods $t_1$-$t_5$, $t_6$-$t_{10}$ and so forth a positive pulse occurs at this output 91 which pulse cuts off the transistor 83 and switch off the damping on the circuit 25. During the rest of the period the transistor 83 conducts with the result that the circuit 25 is damped by the resistor 81.

The gating signal generator 39 includes a synchronizing signal separating circuit 93 coupled to the input 1 and having an output 95 connected to an input 97 of a monostable multivibrator 99 which is excited by the leading edge of the line synchronising pulses 208 separated from the video signal. The synchronizing signal separator circuit 93 has a further output 101 which is connected to an input 103 of a deflection signal generator 105 and output 107 of which is connected to the above-mentioned output 91.

The monostable multivibrator 99 has two outputs 109 and 111 which are connected to the outputs 41 and 42 likewise mentioned above and which provide pulses of opposite polarity during the periods $t_2$-$t_4$, $t_7$-$t_9$. The output 111 is connected through a differentiating network 113, 115 to an input 117 of a limiter amplifier 119 from whose output 121 a sampling pulse is obtained at the instants $t_4$, $t_9$ and is applied to the input 35 connected to the gate electrode of the field effect transistor 53.

What is claimed is:

1. A demodulator circuit comprising input means for receiving a video signal having a line flyback period, and line synchronizing and amplitude modulated pulses occurring during said period; a first gate having a signal input coupled to said input means, a control input, and an output; a second gate having a signal input coupled to said first gate output, a control input, and an output means for supplying a demodulated signal; a resonant circuit having a selected resonant frequency coupled to said first gate output and second gate input; and a gating generator means having an input coupled to said input means for causing oscillations produced by said line synchronizing pulses in said resonant circuit to have zero crossings when oscillations produced by said amplitude modulated pulse signal in said resonant circuit have values different from zero, a first output means coupled to said first gate control input for providing a first gating signal, and a second output means coupled to said second gate control input for providing a second gating signal succeeding said first gating signal by a selected time delay; whereby interference caused by said line synchronizing pulses on said modulated pulses is greatly reduced.

2. A demodulator circuit as claimed in claim 1, wherein the period of the resonant circuit is substantially equal to twice the value of the said delay time and to four times the duration of said modulated pulse.

3. A demodulator circuit as claimed in claim 1 further comprising a damping circuit coupled to the gating generator and to the resonant circuit.

4. A demodulator circuit as claimed in claim 1 wherein said amplitude modulated pulse signals have maximums at said zero crossings.

5. A demodulator circuit as claimed in claim 1 wherein the resonant circuit has a quality factor of between 1.5 and 3.

6. A demodulator circuit as claimed in claim 5 wherein said resonant circuit has a quality substantially equal to two.

* * * * *